United States Patent [19]
Giolitti et al.

[11] Patent Number: 5,424,049
[45] Date of Patent: Jun. 13, 1995

[54] DEVICE FOR REDUCING ODOURS IN THE INTERIOR OF A MOTOR VEHICLE

[75] Inventors: Loredana Giolitti; Salvatore Di Carlo, both of Turin, Italy

[73] Assignee: Fiat Auto S.p.A., Turin, Italy

[21] Appl. No.: 170,455

[22] Filed: Dec. 20, 1993

Related U.S. Application Data

[63] Continuation of Ser. No. 920,108, Jul. 24, 1992, abandoned.

[30] Foreign Application Priority Data

Aug. 7, 1991 [IT] Italy ............... TO91U0198

[51] Int. Cl.$^6$ .......................... F23Q 7/00; A61L 9/03
[52] U.S. Cl. ........................ 422/305; 422/5; 422/120; 422/125; 219/260; 219/265; 392/390
[58] Field of Search ............ 422/125, 5, 120, 305–306, 422/307; 219/260, 264, 265, 267, 274, 275; 392/390, 395; 239/53–54

[56] References Cited

U.S. PATENT DOCUMENTS

| | | | |
|---|---|---|---|
| 3,006,042 | 10/1961 | Calandra | 422/174 |
| 3,434,012 | 3/1969 | Rademacher | 219/260 |
| 3,905,920 | 9/1975 | Botcharoff | 422/186.15 |
| 4,236,061 | 11/1980 | Fenn et al. | 219/265 |
| 4,356,969 | 11/1982 | Obermayer et al. | 239/60 |
| 4,367,203 | 1/1983 | Landsberger | 422/305 |
| 4,574,181 | 3/1986 | Spector | 219/260 |
| 4,686,353 | 8/1987 | Spector | 219/260 |
| 4,692,590 | 9/1987 | Spector | 219/260 |
| 4,731,521 | 3/1988 | Spector et al. | 219/260 |
| 4,919,925 | 4/1990 | Ueda et al. | 422/5 |

FOREIGN PATENT DOCUMENTS

| | | | |
|---|---|---|---|
| 0178119 | 4/1986 | European Pat. Off. | B60N 3/14 |
| 1177493 | 4/1959 | France . | |
| 2618330 | 1/1989 | France | A61K 9/72 |
| 63-282421 | 3/1989 | Japan | F23Q 7/00 |

OTHER PUBLICATIONS

EPO Search Report for Italian Patent Application No. TO91U000198, filed Aug. 7, 1991.

*Primary Examiner*—Robert J. Warden
*Assistant Examiner*—Hien Tran
*Attorney, Agent, or Firm*—Fish & Richardson

[57] ABSTRACT

A device for reducing odors in the interior of a motor vehicle comprises a hollow body of polymer material adapted to contain the extractable cigarette-lighter. The heating of the latter results in the emission of active anti-odor substances contained in the body of polymer material.

3 Claims, 1 Drawing Sheet

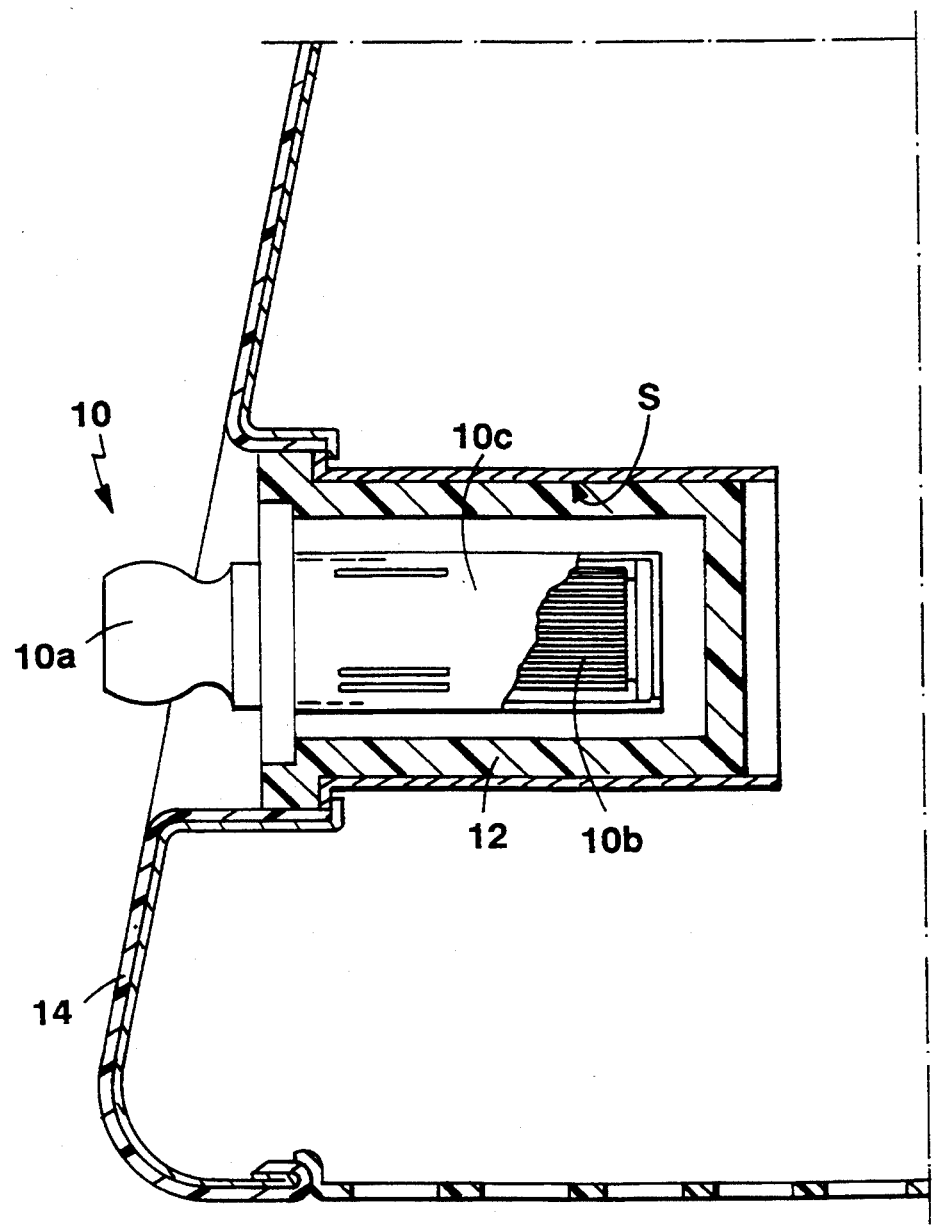
FIGURE

DEVICE FOR REDUCING ODOURS IN THE INTERIOR OF A MOTOR VEHICLE

This is a continuation of application Ser. No. 07/920,108, filed Jul. 24, 1992, now abandoned.

BACKGROUND OF THE INVENTION

This invention relates to a device for reducing odours in the interior of a motor vehicle, especially odours present in the interior of a new motor vehicle.

The use of different types of polymer material in the interior of a motor vehicle often results in perceptible odours, above all in a new motor vehicle, these odours being caused essentially by the slow release of monomers, plasticizers, etc. from the polymer materials. Annoying odours of this kind are at present masked using deodorants which cover these odours. This masking is not always effective and often simply modifies the original odour.

The object of this invention is to provide a device of the type specified at the outset of the description which overcomes the abovementioned disadvantage and can be produced in a simple and economical manner.

SUMMARY OF THE INVENTION

According to the invention, this problem is solved in that the device comprises a body of polymer material containing a substance which is active against odours, associated with a cigarette-lighter mounted on the dashboard of the motor vehicle, heating of the cigarette-lighter resulting in the temporary emission of the active substance from the heated body of polymer material.

The active substance contained in the lattice of the polymer material preferably consists of ketones, aldehydes, aromatic esters, aromatic hydroxides, ethers and essential oils which, as is known, have chelating molecules capable of "imprisoning" the molecules responsible for the unpleasant odour in the interior of the vehicle.

The active substance acts in a substantially different manner from the deodorants used at present, which only mask the odour. Moreover, the association with the cigarette-lighter allows for controlled emission of the active substance, in such a manner that simple actuation of the cigarette-lighter, for example, of the snap-extractable type, results in emission by evaporation of the chelating molecules from the body of polymer material.

The body of polymer material is preferably substantially cup-shaped, so as to contain the extractable cigarette-lighter.

Other advantages and features of the device according to the invention will be clear from the following detailed description, provided purely by way of example, with reference to the accompanying drawing showing a cross section of a cigarette-lighter provided with a device according to the invention.

BRIEF DESCRIPTION OF THE DRAWINGS

The FIGURE is side cross-sectional view of a device according to one embodiment of the invention.

DETAILED DESCRIPTION OF THE PREFERRED EMBODIMENTS

With reference to the drawing, a snap-extractable cigarette-lighter is designated in general by the reference numeral 10, comprising an extraction end 10a, a heating zone 10b provided in the manner known per se with an electrical heating resistance and a central cage zone 10c. The cigarette-lighter 10 is contained in the interior of a framework 12 of thermoplastic material impregnated with an agent adapted to evaporate at a temperature higher than ambient temperature and consisting of chelating molecules in order to remove the odours from the interior of the vehicle. This agent is preferably the one sold under the name OKPE 438, by IFF of Trezzano sul Naviglio, Milan.

The cup-shaped framework 12 is mounted in an appropriate seating S provided on the dashboard 14 of a motor vehicle.

It is clear that the emission of the active agent is controlled by the activation of the cigarette-lighter 10, for example, by means of pressure applied to the end 10a, and it is not activated in a continuous manner, as this could in fact be disagreeable for the users of the motor vehicle as a result of the slight perfume accompanying the emission of the chelating molecules of the active agent. For smokers, emission is automatic each time a cigarette is lit. Of course, this invention may be extended to other models for the same purpose, using the same innovative concept.

For example, the device can be associated with any type of fixed or extractable cigarette-lighter.

We claim:

1. A device for reducing odours in an interior of a motor vehicle, comprising an electrically insulating structural body of polymer material, said electrically insulating body adapted to be mounted in a passengers' compartment of the motor vehicle, and constructed and arranged to define a structural framework for containing an extractable cigarette lighter, said polymer material containing an active substance which includes chelating molecules which evaporate at a temperature above ambient temperature, the polymer and the evaporation temperature of the chelating molecules being selected so that at least a portion of said chelating molecules is released from said polymer material only when the extractable cigarette lighter is heated.

2. A device according to claim 1, wherein the body of polymer material defining said structural framework for the cigarette lighter element is cup-shaped, defining an aperture constructed and arranged to receive the extractable cigarette lighter.

3. A device according to claim 1 or claim 2, wherein the active substance is a compound selected from the group consisting of ketones, aldehydes, aromatic esters, aromatic hydroxides, ethers and essential oils, and mixtures thereof.

* * * * *